Figure 1:
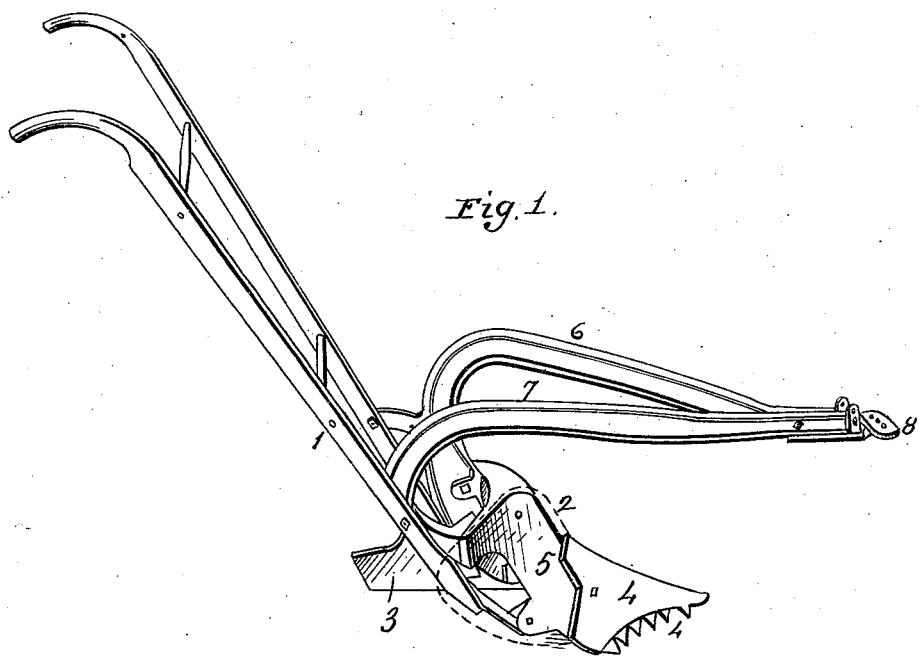

P. H. STARKE.

Plow.

No. 77,547.

Patented May 5, 1868.

Witnesses:
Jas. F. Phillips
H. Dove

Inventor
P. H. Starke

United States Patent Office.

P. H. STARKE, OF RICHMOND, VIRGINIA.

Letters Patent No. 77,547, dated May 5, 1868.

IMPROVEMENT IN PLOUGHS.

The Schedule referred to in these Letters Patent and making part of the same.

Be it known that I, P. H. STARKE, of the city of Richmond, State of Virginia, have invented a new and useful Improvement in Ploughs; and I do hereby declare that the following is a full and exact description of the same, reference being had to the accompanying drawings, and to the figures of reference marked thereon.

To enable others skilled in the art to make and use my invention, I proceed to describe its construction and operation.

First. I make a standard or centre frame-piece, to which the mould-board, land-side, point, and beams, are attached, which is numbered 5, having no vertical connection with the beams, dispensing with what is usually called the throat of the plough, and thus having no point for the weeds and trash to accumulate against. Then I attach to the rear, and right, and left extremes of this standard, two beams, Nos. 6 and 7, made fast by bolts put through their rear ends, curving backward, then upward, and outward, both to right and left, so as not to approach near enough to the point where the throat in other ploughs usually is, to cause choking or clogging, but to curve sufficiently high and wide to prevent this choking, (the distance to be determined by the size of the plough and the work to be done,) these beams coming together in front of the point at which the earth turns on the mould-board, No. 2, and thence to the central point of draught, to which the clevis is attached. I then put on the mould-board, No. 2, which can be of any required size or shape, bolted to the standard, and prevented from moving or straining the bolts, by knobs on the mould-board, fitting into sockets or holes in the standard. I next put on the land-side, No. 3, in the usual way, by bolts, and then the point, No. 4, fastened by bolt or bolts, the point being indented or having a succession of points, instead of a point and share as is usual, each one of these points having nearly a square cut to the front, thus avoiding the wedging of the plough against the land-side. I then put on the handles, which are made fast to this standard and beams, but not attached to the mould-board at all. I make the handles of wood, and all the other parts of metal.

All other ploughs pull by one beam, attached to one side of the mould-board, as a cart would if it had but one shaft, but this plough, which I call the Reconstructor, pulls by two beams or shafts, attached, as the shafts of a cart, to the outer extremes of the resistance to be overcome, and coming together, as the pole of an ox-cart, at the centre, thus obviating all side draught, and becoming purely a centre-draught plough, the beams dividing the weeds in front, push them off right and left, so as they cannot reach the mould-board, and the standard having no vertical connection with the beams, there is no place left for clogging, and consequently the plough cannot choke.

Now, having fully described my invention, what I claim, and wish to secure by Letters Patent, is—

1. The double beams, Nos. 6 and 7, attached to the standard, as described, for the saving of power and prevention of choking.

2. The standard or frame-pieces, No. 5, having no vertical connection with the beams, to which the other parts are attached, as described.

3. I claim the point, No. 4, indented with a succession of points, in place of a share, each of its cutting parts presented nearly square to the front to prevent the plough from being wedged or pressed so hard against the land as to wear the land-side, and cause considerable loss of power thereby.

To all the foregoing, I do hereby affix my signature, in presence of the following witnesses.

P. H. STARKE.

Witnesses:
   J. W. WILLIAMS,
   W. A. ELLIOTT.